United States Patent
Karlin

(10) Patent No.: US 7,369,291 B2
(45) Date of Patent: May 6, 2008

(54) SLM ADDRESSING METHODS AND APPARATUSES

(75) Inventor: Tord Karlin, Täby (SE)

(73) Assignee: Micronic Laser Systems AB, Taby (SE)

( * ) Notice: Subject to any disclaimer, the term of this patent is extended or adjusted under 35 U.S.C. 154(b) by 58 days.

(21) Appl. No.: 11/188,876

(22) Filed: Jul. 26, 2005

(65) Prior Publication Data

US 2005/0270615 A1  Dec. 8, 2005

Related U.S. Application Data

(63) Continuation-in-part of application No. PCT/SE2004/000124, filed on Jan. 30, 2004.

(30) Foreign Application Priority Data

Jan. 31, 2003   (SE) .................................... 0300240

(51) Int. Cl.
   *G02B 26/00*   (2006.01)
(52) U.S. Cl. ..................................... 359/239
(58) Field of Classification Search ............... 359/239, 359/290, 291, 292, 295, 298, 220, 222, 223, 359/320, 871, 872, 873; 345/84, 85, 108
See application file for complete search history.

(56) References Cited

U.S. PATENT DOCUMENTS

| 3,746,911 A | 7/1973 | Nathanson et al. |
| 5,671,083 A | 9/1997 | Conner et al. |
| 6,885,493 B2 * | 4/2005 | Ljungblad et al. .......... 359/290 |

FOREIGN PATENT DOCUMENTS

| EP | 0 419 853 A2 | 4/1994 |
| WO | WO 02/063371 | 8/2002 |
| WO | WO 02/063596 | 8/2002 |

OTHER PUBLICATIONS

International Search Report, International Preliminary Examination Report & Written Opinion.

* cited by examiner

*Primary Examiner*—Ricky Mack
*Assistant Examiner*—Tuyen Tra
(74) *Attorney, Agent, or Firm*—Harness, Dickey & Pierce, P.L.C.

(57) ABSTRACT

A spatial light modulator may include a plurality of deflectable modulating elements. Each of the deflectable modulating elements may further include a support structure, an electrostatically deflectable mirror element and at least one electrode. The mirror element may be set to a deflection state by charging and selectively discharging a capacitor coupled to the at least one electrode.

33 Claims, 8 Drawing Sheets

SLM ADDRESSING METHODS AND APPARATUSES

PRIORITY STATEMENT

This U.S. non-provisional application is a continuation-in-part under 35 U.S.C. § 111(a) of PCT International Application No. PCT/SE2004/000124, which has an international filing date of Jan. 30, 2004, which designated the United States of America, and which claims priority under 35 U.S.C. § 119 of Swedish Patent Applicant No. 0300240-9, filed on Jan. 31, 2003, the entire contents of both of which are hereby incorporated by reference.

BACKGROUND OF THE INVENTION

1. Field of the Invention

Example embodiments of the present invention relate to spatial light modulators (SLMs) and methods for addressing the same.

2. Description of the Related Art

Related art micro-electromechanical systems (MEMS) may include movable mirrors fabricated on wafer substrates using micro-electronic processing techniques. In these related art MEMS, electrostatic actuation may be used to deflect the micro-mirrors. For example, a voltage may be generated between two electrodes, one of which is stationary and the other of which positioned on the mirror, in order to produce a force between the two electrodes.

A related art SLM with an array of actuators (e.g., micro-mirrors, reflecting elements, modulating elements, pixel elements, etc.) used in, for example, a mask writing tool or a chip manufacturing tool may be loaded with a specific pattern. Each actuator may be in an addressed state or a non-addressed state before respective stamps may be printed. This pattern may be a subset of the pattern to be printed on the mask or chip, respectively. Each actuator mirror may be deflected electrostatically by applying voltage between the mirror and an underlying address electrode, after which the actuator mirror may move into a deflected state before an electromagnetic radiation source may be triggered to print the stamp.

An SLM may be loaded in an analogue mode by applying one potential to the mirrors and individually addressing at least one electrode belonging to each of the mirrors in order to create a pattern of the SLM. In the analogue mode, the SLM mirror may be set to a number of different states, for example, 64 or 128 states ranging from non-deflected (e.g., completely non-deflected or minimum deflection) to a higher (e.g., maximum) deflection. A maximum deflection may be a state in which little or no electromagnetic radiation impinges on the micro-mirror, and minimum deflection may be defined as full reflection of the impinged electromagnetic radiation.

In a related art digital SLM, maximum deflection may be when the reflected electromagnetic beam is deflected out of the target plane and minimum deflection may be full reflection of the impinged electromagnetic radiation. Related art digital SLMs operate in a deflection mode, while related art analogue SLMs operate in a diffraction mode. The degree of deflecting individual elements may vary between those digital and analogue SLMs, where the analogue SLMs may be deflected parts of a degree and the digital SLMs may be deflected several degrees.

FIG. 3 illustrates a side view of a related art actuator 300. As shown in FIG. 3, the actuator structure 300 may be, for example, a micro-mirror structure in a spatial light modulator (SLM), and may include a substrate 313, a first electrode 312, a second electrode 314, a support structure 311 and a movable element 310. The substrate 313 may be made of semi-conducting material and may comprise one or a plurality of circuits (e.g., CMOS circuits). The first and second electrodes 312 and 314 may be made of an electrically conductive material, for example, gold, copper, silver, alloys thereof and/or other electrically conductive materials. The electrodes 312 and 314 may be connectable to steering circuits, such as, the above-mentioned circuit.

The support structure 311 may be manufactured of a stiff (e.g., relatively stiff) material, for example, single crystal silicon or any similar, or substantially similar materials. The movable element 310 may be manufactured of a material having suitable (e.g., good) optical properties, for example, aluminum or any other suitable metallic material. Alternatively, a material without the above characteristics may be coated with one or a plurality of other materials having suitable characteristics, and a sandwich structure may be created.

An electrostatic force may deflect the movable element 310. Applying different potentials on the movable element 310 and the first electrode 312 or second electrode 314 may create electrostatic force. When a first potential is applied to the movable element 310 and a second (e.g., different) potential is applied to the first and second electrodes 312 and 314, an electrostatic force may be generated, but may not deflect the movable element 310, for example, because the attractive force, which may be attractive independent of the polarity of the potential difference, between the first electrode 312 and the mirror may be equivalent, or substantially equivalent, to the attractive force between the second electrode 314 and the same mirror. The two attractive forces may equalize each other.

In FIG. 3 the actuator structure may include the first 312 and second 314 electrodes. However, deflecting the movable element 310 may require one electrode, either the first electrode 312 or second electrode 313. However, two electrodes arranged spaced apart from each other may allow the mirror to be deflected in two different directions.

SUMMARY OF THE INVENTION

Example embodiments of the present invention provide methods of addressing micro-elements, which may facilitate the manufacturing of smaller pixel elements in an SLM.

An example embodiment of the present invention provides a spatial light modulator (SLM), which may include a plurality of modulating elements, which may further include a support structure, a mirror element positioned on the support structure, and at least one electrode capable of setting the mirror element to a deflection state by charging and selectively discharging a corresponding capacitor coupled to the at least one electrode by impinging electromagnetic radiation onto the corresponding capacitor.

Another example embodiment of the present invention provides an apparatus including an electromagnetic radiation source and a spatial light modulator. The spatial light modulator may include a plurality of reflecting elements at least one of which may have at least one electrode coupled to one of a plurality of capacitors. The electromagnetic radiation may be reflected toward a material by the spatial light modulator after the at least one reflecting element as been selectively set to a deflection state by selectively discharging the one of the plurality of capacitors coupled to the electrode. Another example embodiment of the present invention provides a method including charging at least one capacitor to a potential capable of setting at least one deflectable modulating element, and setting the at least one deflectable modulating element by selectively discharging the at least one capacitor. The at least one capacitor may be discharged by selectively impinging electromagnetic radiation onto the at least one capacitor.

Another example embodiment of the present invention provides an apparatus including an electromagnetic radiation source, a spatial light modulator, a projection system and a positioning system. The spatial light modulator may have a plurality of deflectable modulating elements adapted to be illuminated by the electromagnetic radiation. The projection system may be adapted to create an image of the spatial light modulator on a workpiece. The positioning system may be adapted to position at least one of the workpiece and the projection system relative to each other. The modulating elements may be adapted to create a number of modulating states greater than or equal to two by charging at least one capacitor, and at least one of the deflectable modulating elements may include a capacitor chargeable with a potential capable to set the deflectable modulating element by selectively discharging the capacitor to a potential.

Another example embodiment of the present invention provides an apparatus including an electromagnetic radiation source adapted to emit electromagnetic radiation to be received by a workpiece, and a spatial light modulator. The spatial light modulator may include at least one deflectable modulating element, each of the at least one deflectable modulating element including a capacitor. The at least one deflectable modulating element may be adapted to at least one of reflect and refract the electromagnetic radiation from the electromagnetic radiation source toward the workpiece. The at least one deflectable modulating element may be further adapted to be set to a deflection state by charging and selectively discharging the capacitor.

In example embodiments of the present invention, an image may be positioned on the workpiece. At least one deflectable modulating element having a capacitor, which may be charged with a potential capable to set the at least one deflectable modulating element. The at least one deflectable modulating element may be set to a deflection state by selectively discharging the at least one capacitor, and electromagnetic radiation may be emitted onto the at least one deflectable modulating element to create an image on the workpiece.

In example embodiments of the present invention, at least one mirror, reflecting and/or deflectable modulating element may be set by at least one of varying a period of time an intensity of the electromagnetic radiation is impinged and alternating the intensity of the electromagnetic radiation impinged over a period of time.

In example embodiments of the present invention, the electromagnetic radiation may impinge on at least one capacitor, for example, or a plurality of capacitors in order to selectively discharge at least one capacitor.

In example embodiments of the present invention, at least one mirror, reflecting and/or deflectable modulating element may be deflected or non-deflected and/or the capacitor may be fully charged before selectively discharging at least one capacitor, for example, by impinging electromagnetic radiation on the capacitor. In example embodiments of the present invention, one or more mirror, reflecting and/or deflectable modulating elements may be set individually by at least one of alternating the period of time over which an intensity of the electromagnetic radiation is impinged and alternating the intensity of the electromagnetic radiation impinged over a period of time. In example embodiments of the present invention, the discharging may be performed by a diode and/or a diode array associated with at least one capacitor and adapted to discharge the at least one capacitor. In example embodiments of the present invention, the charging of one or more capacitors may cause at least one mirror, reflecting and/or deflectable modulating element to be placed in a state between a maximum and a minimum deflection state. In example embodiments of the present invention, each of a plurality of mirror, reflecting and/or deflectable modulating elements may include a corresponding capacitor and an electrode of each of the corresponding capacitors may be coupled together. In example embodiments of the present invention, the laser beam discharging at least one capacitor may be separate from the laser beam illuminating the mirror, reflecting and/or deflectable modulating elements for creating the image on the workpiece and the laser beam discharging the capacitor may have a wavelength, which may not affect the workpiece.

DETAILED DESCRIPTION OF EXAMPLE EMBODIMENTS OF THE PRESENT INVENTION

The following detailed description is made with reference to the figures, which illustrate example embodiments of the present invention. Example embodiments are described to illustrate the present invention, not to limit its scope, which is defined by the claims. Those of ordinary skill in the art will recognize a variety of equivalent variations on the description that follows.

Further, example embodiments of the present invention will be described with reference to a micro-mirror SLM. However, it will be understood that in example embodiments of the present invention spatial light modulators may be comprised of any suitable pixels, for example, transmissive pixels.

Figure 1:
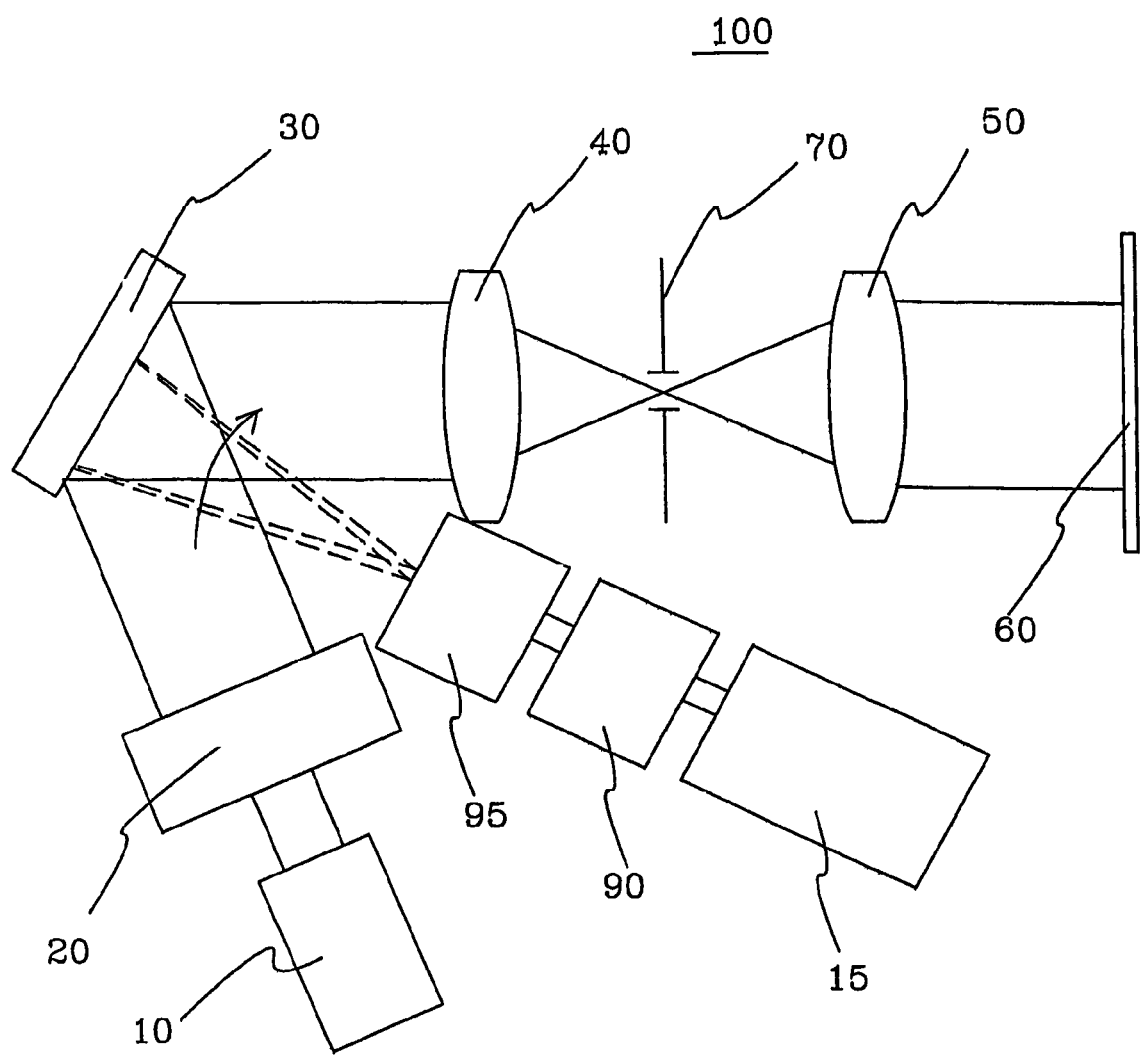
FIG. 1 illustrates schematically a top view of a system for addressing and patterning a workpiece according to an example embodiment of the present invention.
Figure 9:
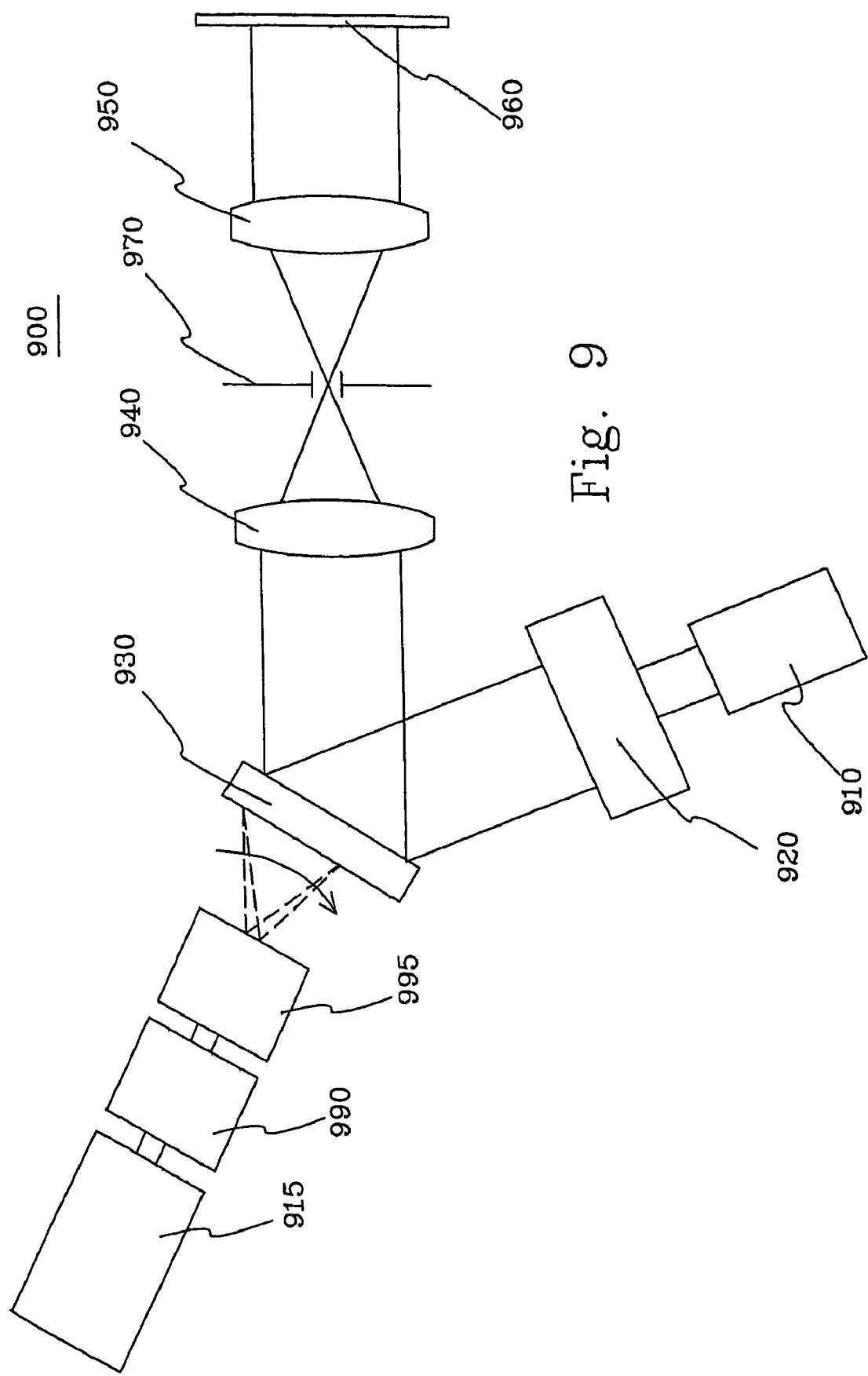
FIG. 9 illustrates schematically a top view of an apparatus for addressing and patterning a workpiece according to another example embodiment of the present invention.

FIGS. 1 and 9 illustrate top views of pattern generators 100 and 900 according to example embodiments of the present invention. These example embodiments may include a first laser source 10, 910; a beam shaper 20, 920; a spatial light modulator (SLM) 30, 930; a first lens 40, 940; a spatial filter 70, 970; a second lens 50, 950; a second laser source 15, 915; a modulator 90, 990 and/or a deflector 95, 995.

The first laser source 10, 910 may be a pulsed laser, for example an excimer laser with an output of, for example, about 248 nm, 193 nm, 157 nm or less, and a repetition rate of, for example, about 1000 kHz; however, it will be understood that any suitable repetition rate greater than or less than the above repetition rates may also be used.

The beam shaper 20, 920 may shape a radiated beam from the first laser source 10, 910. The beam shaper 20, 920 may include at least one lens (e.g., one or a plurality of lenses) for shaping the beam, for example, into a rectangular shape or any other suitable shape similar, or substantially similar to the shape of the SLM 30, 930. The beam shaper 20, 920 may also adjust output intensity from the first laser source 10, 910. Although not illustrated in FIGS. 1 or 9, a beam-diffusing element may be introduced in a beam path between the first laser source 10, 910 and the SLM 30, 930 and the intensity of the laser may be reduced.

A beam of (e.g., having a desired shape and desired homogeneity) may be impinged onto the SLM 30, 930, and the beam may be modulated and relayed by the SLM 30, 930 onto the workpiece 60, 960 via the first lens 40, 940, the second lens 50, 950 and the spatial filter 70, 970.

Pixel elements in the SLM 30, 930 may be set to a plurality of states individually, for example, 64 or 128 states between a deflected state (e.g., a maximum deflected state and a non-deflected state (e.g., an non-deflected or minimum deflected state); however, any suitable number of states may be used. The spatial filter 70, 970 may remove diffraction orders greater than, or equal to, 1 and may transmit the zero order of diffraction from the SLM 30, 930. The spatial filter 70, 970 may be, for example, a Fourier filter, the first lens 40, 940 may be Fourier lens and the second lens 50, 950 may be a projection lens; however, any suitable filter and/or lenses may be used. Although not described herein, methods according to example embodiments of the present invention may also be used in micro-mirror device structures having, for example, two states (e.g., on and off). The spatial filter 70, 970, the first lens 40, 940 and the second lens 50, 950 may comprise a projection system and may create an image on the workpiece 60, 960. Projection systems according to example embodiments of the present invention have been described with regard to an SLM operated in an analog mode; however, variations of the projection system may be made based on, for example, the type of SLM used, sizes and/or geometries of the housing in which the projection system may be located.

The workpiece 60, 960 may be arranged on a movable stage including a precision mechanical system for positioning the workpiece 60, 960 and/or the projection system relative to each other. The precision mechanical system may perform a constant, or substantially constant, movement of the workpiece 60, 960 during patterning. The SLM 30, 930 may provide images including a plurality of pixel elements, corresponding to, for example, a provided pattern, which may be projected onto the workpiece 60, 960. Each of the plurality of pixel elements may be focused (e.g., simultaneously) on different locations of the workpiece. After an image has been exposed, the workpiece 60, 960 may move and another image may be exposed. Between exposures pixel elements may be altered according to a pixel mask pattern.

As shown, the systems of FIGS. 1 and 9 may be similar or substantially similar, to each other; however, except for the positioning of the second laser 15, 915, modulator 90, 990 and the deflector 95, 995. FIG. 1 illustrates front side discharging and FIG. 9 illustrates backside discharging of a capacitor. In FIG. 9, the capacitors may be discharged from the backside and the discharging may be more efficient, for example, because the actuator element may shadow a portion (e.g., the majority) of a capacitor.

Figure 4:
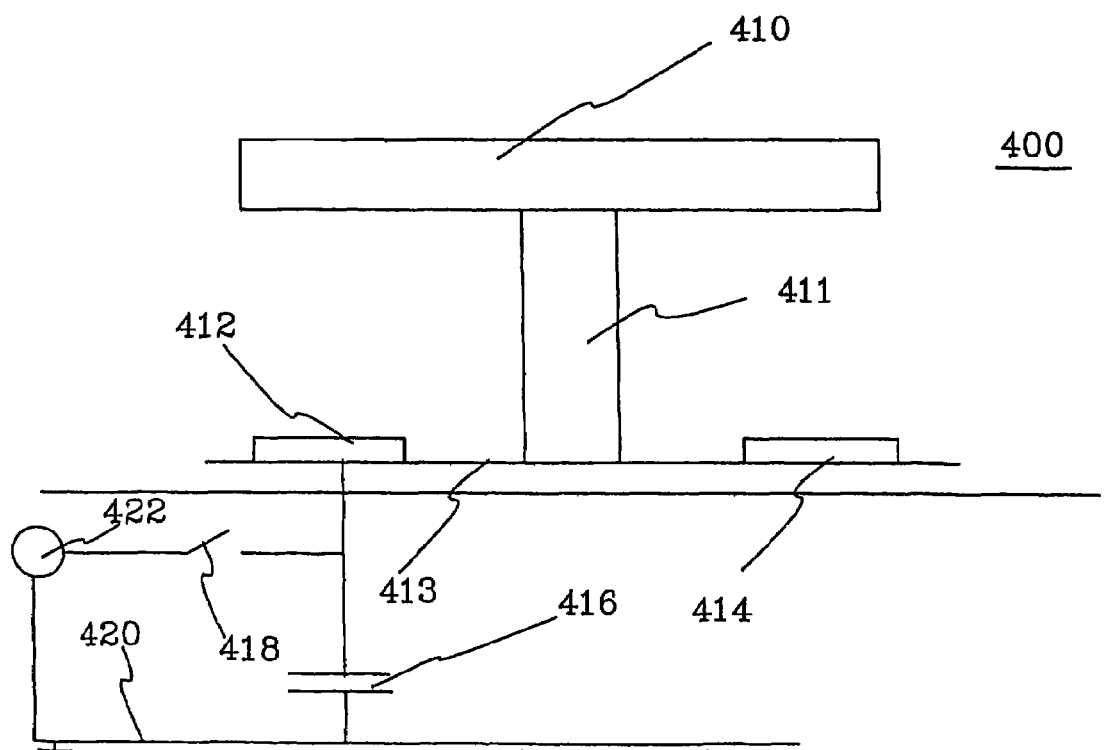
FIG. 4 illustrates schematically a side view of an actuator structure according to an example embodiment of the present invention.

As shown in FIG. 1, the second laser 15 may be used for setting the pixel elements. FIG. 4 illustrates an actuator structure according to an example embodiment of the present invention, which may be used for setting the pixel elements in the SLM 30, 930. As shown in FIGS. 1, 4 and 9, the pixel elements may be set by illuminating a capacitor 416 connected to an electrode 412 beneath a movable element 410 supported by a support structure 411 on a substrate 413. By illuminating the capacitor 416 with the laser source 15, 915, the capacitor 416 may be discharged (e.g., gradually discharged). The rate of discharging the capacitor 416 may depend on the intensity of the radiation and/or the period of time the radiation may impinge on the capacitor 416. In one example, the electrode 412 may be charged to a potential corresponding to a higher (e.g., a maximum) deflection state of the movable element 410.

One side of the capacitor 416 may be connected via a switch 418 to a potential source 422. The source 422 may be connected to a common ground plane 420. When charging the capacitor 416, the switch 418 may be closed. The switch 418 may be any kind of a switch, for example, a mechanically operated switch, an optically operated switch, a semiconductor switch or any other suitable switch. The semiconductor switch may be, for example, a transistor. If the switch is a semiconductor switch, when discharging the capacitor 416 to a value, for example, a deflection state of the micro-mirror element, the switch 418 may be open.

By illuminating the charged capacitor 416, the potential of the movable element 410 may be set to any value between the higher (e.g., maximum) deflection state and a non-deflection state.

In another example or in addition to the above example, the capacitor 416 may be initially fully charged or substantially fully charged. A fully, or substantially fully, charged capacitor 416 may or may not correspond to a higher (e.g., maximum) deflection state of the movable element 410. The capacitor 416 may also be charged to any value corresponding to a deflection state between the higher (e.g., maximum) deflection and non-deflection. For example, all, or substantially all, capacitors may be initially charged to the same, or substantially the same, level, and a uniform, or substantially uniform, degree of deflection for all, or substantially all, pixel elements may be created.

In an SLM including numerous modulating elements the switches 418 may be commonly operated so that all, or substantially all, modulating elements in the SLM may be initially set to the same, or substantially the same, deflection state.

The second laser 15, 915 may radiate a wavelength, which may not affect an electromagnetic radiation sensitive coating on the workpiece 60, 960. Illuminating the backside or front side of the SLM may perform the discharging. In example embodiments of the present invention, any suitable wavelength for discharging may be chosen, for example, the second laser 15, 915 may be an ultraviolet illumination source or any other suitable illumination source capable of discharging the capacitor 416.

A ground plane may be common to all movable elements in an SLM. The common ground plane may be formed, for example, by connecting (e.g., coupling) a side of the capacitors together. In example embodiments of the present invention, the common plane may be at ground potential; however, it will be understood that the common plane may be held at any suitable potential.

Figure 5:
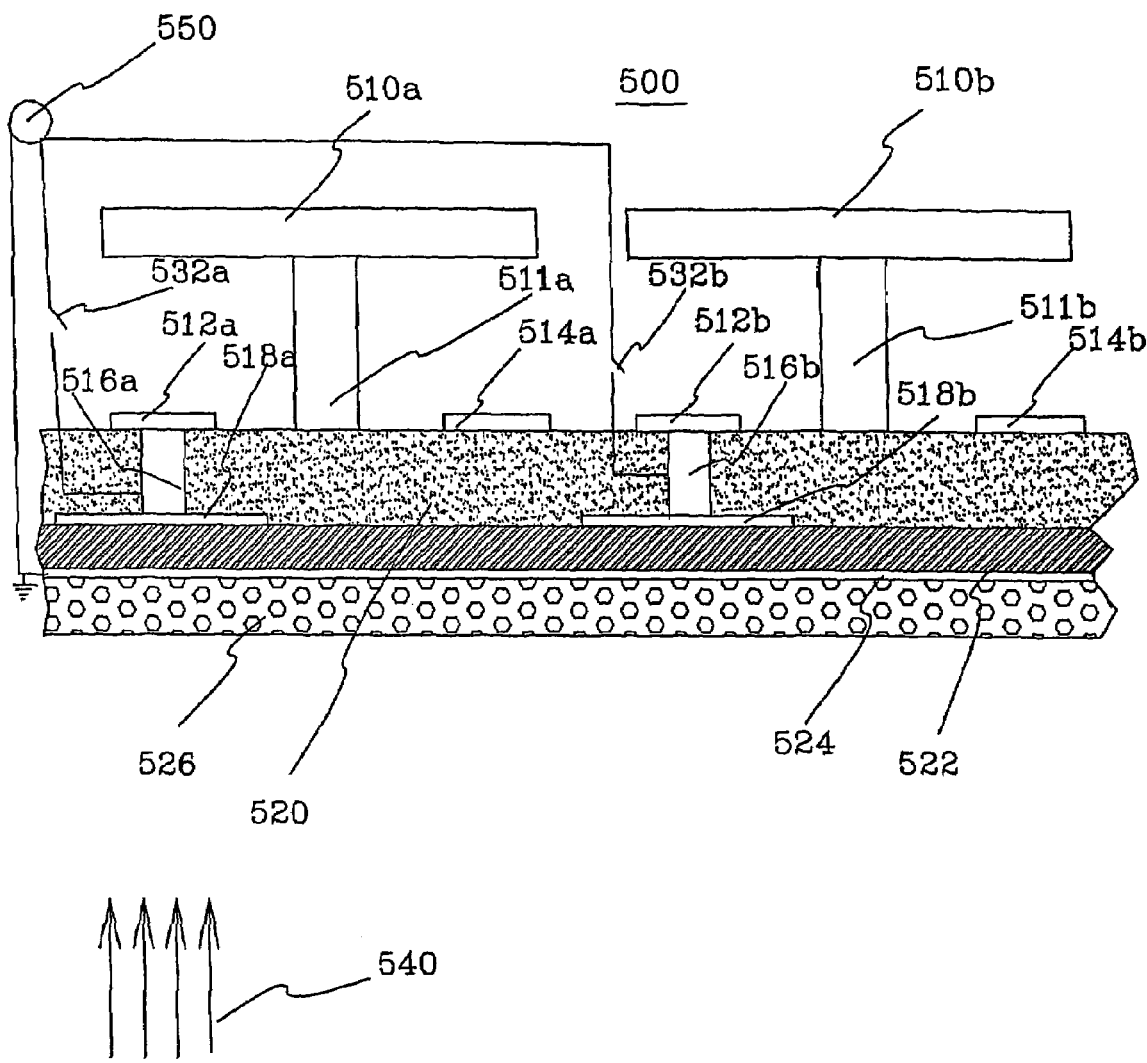
FIG. 5 illustrates a side view of two adjacent actuator structures according to an example embodiment of the present invention.

FIG. 5 illustrates a side view of two actuators 500 according to an example embodiment of the present invention, which may be set from a first state to a second state by electromagnetic illumination 540. The actuators 500 may belong to an SLM including, for example, several millions of the actuators 500; however, only two actuators are illustrated for the sake of clarity. As shown in FIG. 5, the actuators 500 may include mirror elements 510a, 510b, support structures 511a, 511b, first electrodes 512a, 512b, second electrodes 514a, 514b, via connectors 516a, 516b, first electrodes 518a, 518b of a capacitor, a second electrode 524 of the capacitor; isolating material 520, 522, a transparent substrate 526, switches 532a, 532b and/or a potential source 550.

As shown in FIG. 5, all, or substantially all, mirror elements 510a, 510b may first be set to a deflection state. A voltage of, for example, 10 V may be applied between the second electrode 524 of the capacitor and the first electrodes 518a, 518b of the capacitor by closing the switches 532a, 532b to the potential source 550. In this example, the second electrode 524 of the capacitor may be set to ground potential, the first electrode 518a, 518b of the capacitor may be charged to 10V, which may result in a 10 V potential on the first electrode 512a, 512b. The mirror element 510a, 510b may be set to ground potential and the second electrode 514a, 514b may also be set to 10V. As shown in FIG. 5, the mirror element 510a, 510b may be in a non-deflected state, the connection of the first electrode 518a, 518b to 10V may be released (e.g., the switches 532a, 532b may be opened) and electromagnetic radiation 540 may be impinged onto the second electrode 524 for discharging (e.g., selectively discharging) the capacitor, for example, to a desired level. When impinging electromagnetic radiation 540 of a certain intensity and/or wavelength for a shorter period of time, the first electrode 512a, 512b may decrease its potential from about 10V to, for example, a value between about 10V and about ground potential. When the electromagnetic radiation impinges on the second electrode 524, the electrode 512a, 512b may further decrease its potential and may have about ground potential after a period of time. Ground potential on the first electrodes 512a, 512b and 10V on the second electrodes 514a, 514b, may result in the mirror elements to be in a higher (e.g., maximum) deflected state.

In another example, the second electrode 514a, 514b may be connected to ground potential. In this example, the mirror element 510a, 510b may be in a higher (e.g., a maximum) deflected state and as the capacitor may discharge, the mirror element may be non-deflected (e.g., gradually).

In example embodiments of the present invention, the time to set the electrode 512a, 512b to a certain potential may depend on the intensity of the electromagnetic radiation, the distance between the first electrode 518a, 518b and the second electrode 524, the material between the first electrode 518a, 518b and the second electrode 524 and/or the area of the first electrode 518a, 518b (e.g., assuming that the area of the second electrode 524 is greater than the first electrode 518a, 518b).

Individual pixel elements (e.g., movable elements) may be set to a degree of deflection, for example, by illuminating electromagnetic radiation onto the first electrode 518a, 518b. The magnitude of the illumination may be selected (e.g., fixed) and the degree of deflection may be varied by changing the time each capacitor is illuminated. For example, the longer a capacitor is illuminated the more non-deflected or deflected (e.g., depending on the initial settings), the movable element may become.

In another example, instead of illuminating the capacitor with a constant (e.g., substantially constant) intensity and changing the period of time of the illumination, a variable intensity of the electromagnetic radiation may be used with a constant illumination period of time in order to achieve different degrees of deflection. In yet another example, both the period of illumination time and the intensity of the electromagnetic radiation may be varied in order to achieve a deflection state.

In example embodiments of the present invention, different methods of illuminating the capacitors may be used. For example, a beam may be scanned from one pixel element to another on the SLM until each pixel element may be set to a deflection state (e.g., a desired deflection state). In example embodiments of the present invention, a modulator (e.g., the modulator 90 of FIG. 1) may be used to change the period of illumination time and/or the intensity of the radiation, and the deflector 95 may be used to sweep and/or scan the radiation over the surface of the SLM.

For example, in FIG. 1, a cross sectional area of a beam from the second laser 15 may be smaller than the size of the capacitor may allow a specific capacitor to be discharged more easily and/or make aligning the beam with the pixel elements easier. In some example cases, the smaller cross sectional area the easier the alignment.

In order to speed up generation of a pattern on the SLM, a plurality of laser beams may be used, for example, simultaneously. For example, a diffraction element may be introduced between the laser 15 and the modulator 90 for creating multiple beams.

Figure 2:
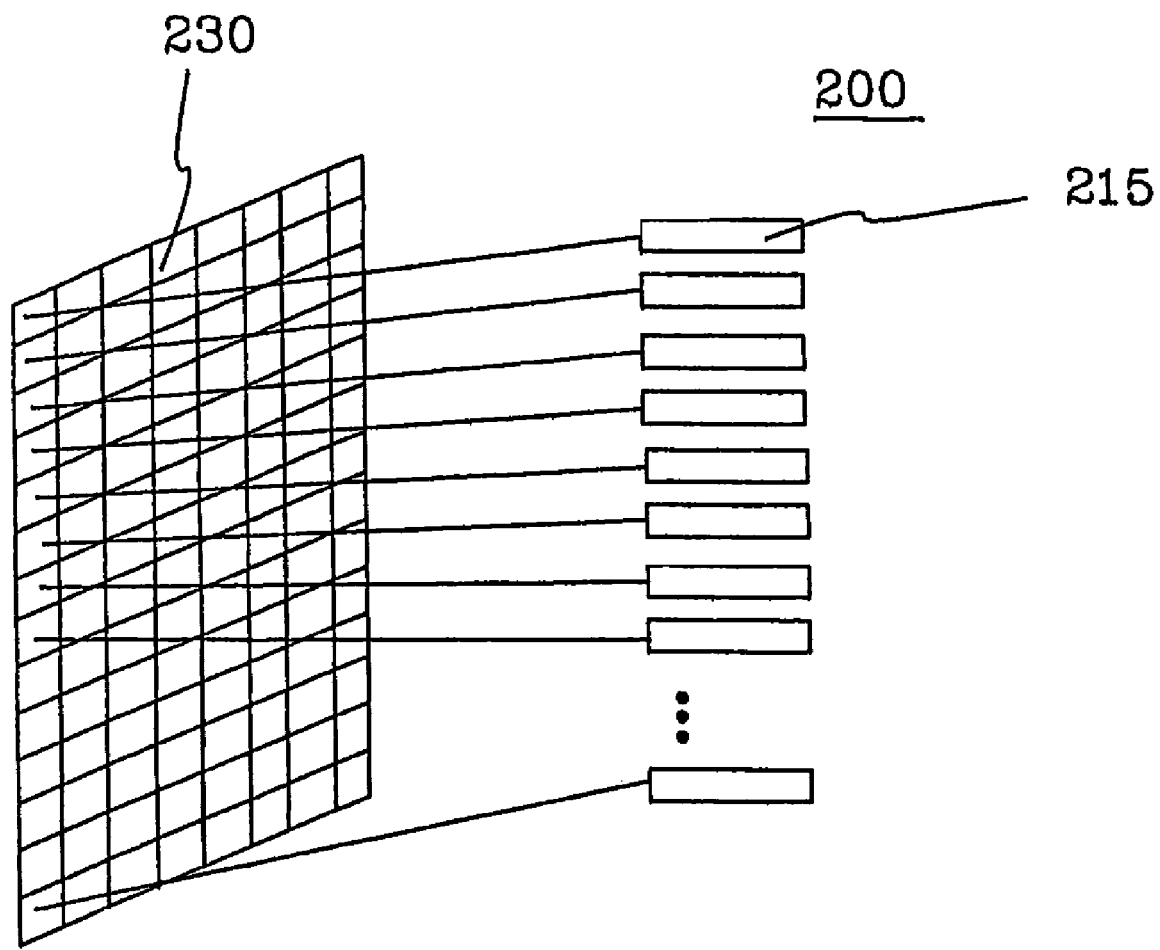
FIG. 2 illustrates schematically a perspective view of a method for addressing a spatial light modulator according to an example embodiment of the present invention.
Figure 3:
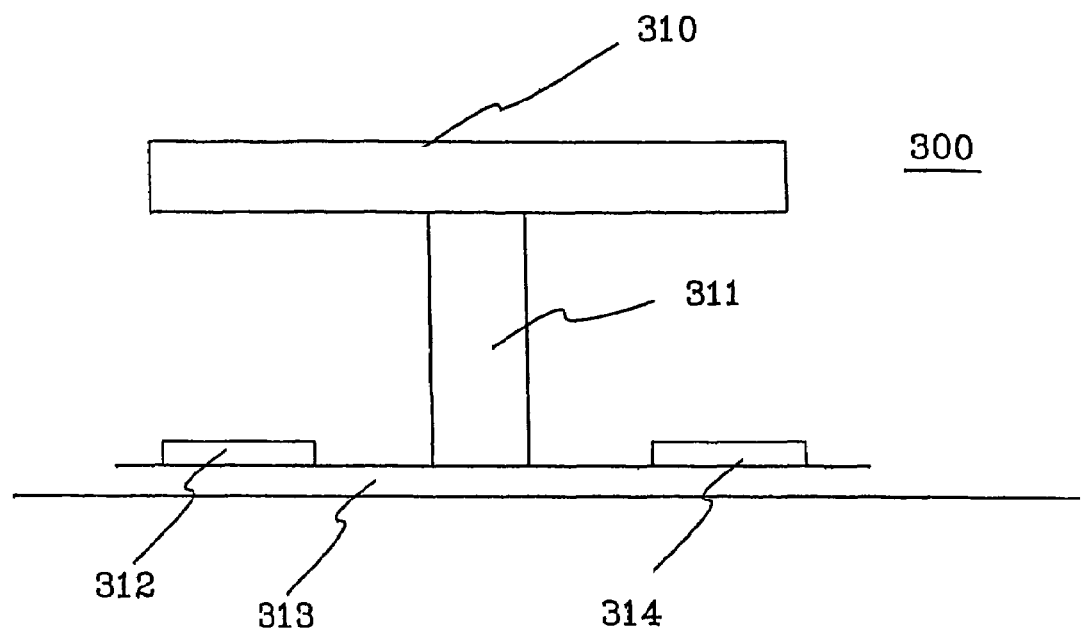
FIG. 3 illustrates schematically a side view of related art actuator structure.

Alternatively, as illustrated in FIG. 2, an array of diodes 215 may be used to scan the SLM 230. Each diode may be set individually to achieve a discharging of a respective capacitor. The setup 200 of FIG. 2 may be used in conjunction with front or back illumination of the SLM (e.g., as shown in FIGS. 1 and 9, for example) in order to set the pixels to respective deflection states.

Figure 6:
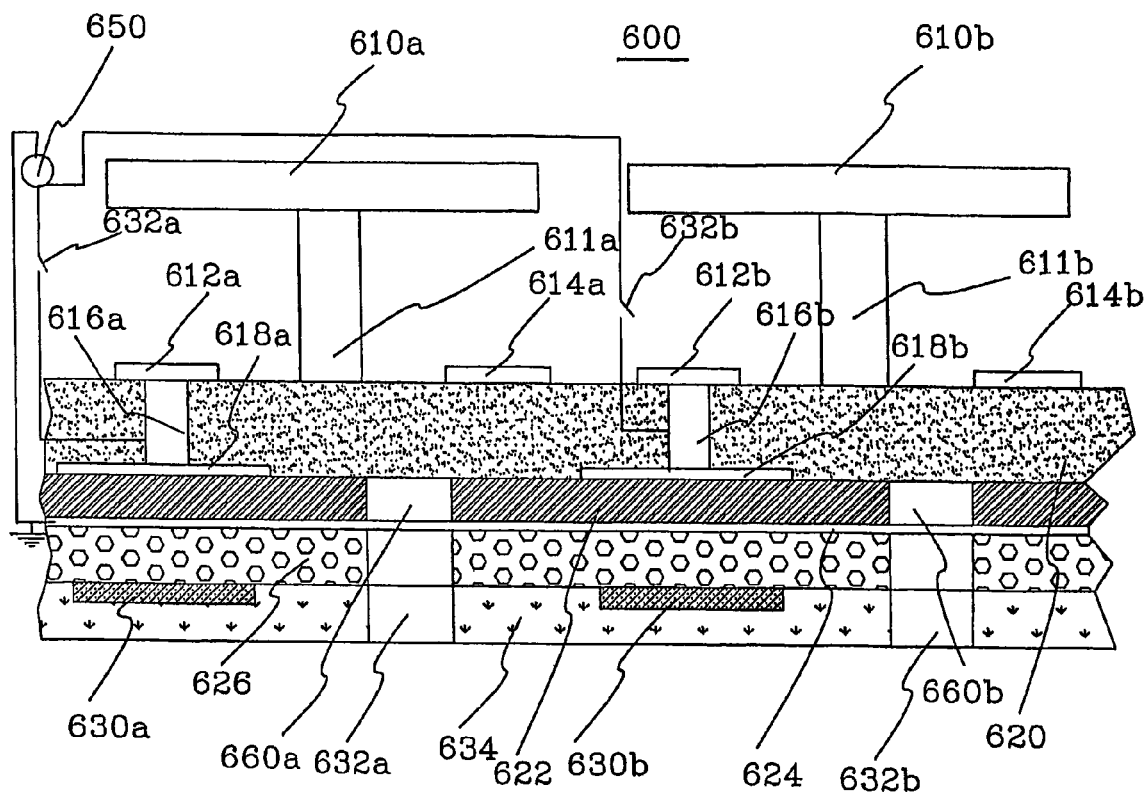
FIG. 6 illustrates a side view of two adjacent actuator structures according to another example embodiment of the present invention.

FIG. 6 illustrates a side view of two actuators 600 according to another example embodiment of the present invention, which may be set using electromagnetic illumination. As shown in FIG. 6, the actuators 600 may include mirror elements 610a, 610b; support structures 611a, 611b; first electrodes 612a, 612b; second electrodes 614a, 614b; via connectors 616a, 616b; first electrodes 618a, 618b of a capacitor; a second electrode 624 of said capacitor; isolating material 620, 622, a transparent substrate 626, a semiconducting material including an n-doped region 634 and p-doped regions 630a, 630b, opaque isolators 632a, 632b, 660a, 660b, switches 632a, 632b and/or a potential source 650.

The actuator 600 of FIG. 6 may functional in a manner similar, or substantially similar, to that described above with regard to FIG. 5 and, thus, the function of the actuator 600 will not be described in further detail. However, the actuator 600 of FIG. 6 may differ from the actuators 500 of FIG. 5 in that the actuator 600 may include a light emitting diode (LED) connected to the actuator 600. The opaque isolator 632a, 632b, 660a, 660b regions may also be introduced for suppressing (e.g., eliminating) crosstalk between different LEDs. In example embodiments of the present invention, one LED per pixel element may be used, and the LED may be manufactured using the same, or substantially the same, process as the SLM.

Figure 7:
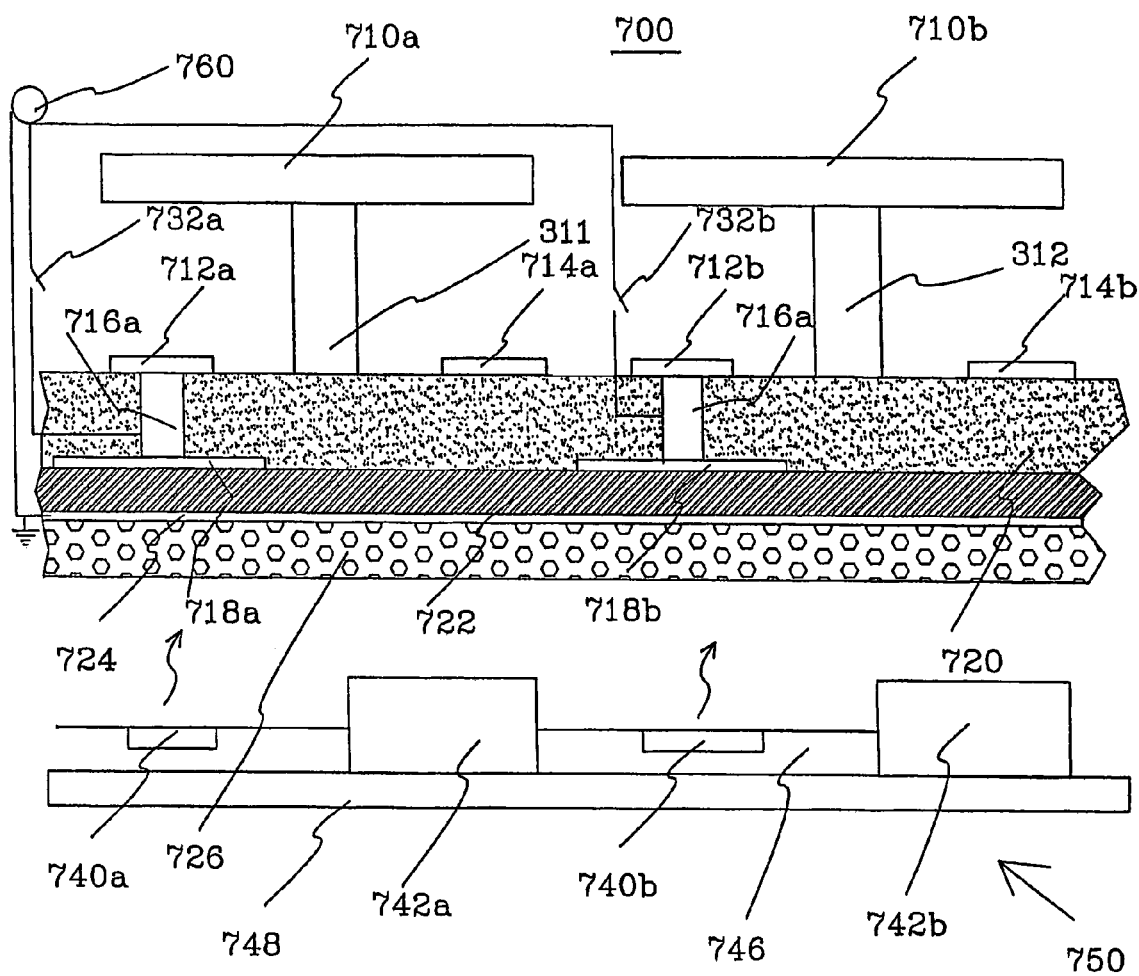
FIG. 7 illustrates a side view of two adjacent actuator structures according to another example embodiment of the present invention.

FIG. 7 illustrates a side view of two actuators 700 according to another example embodiment of the present invention, which may be set by electromagnetic illumination. The actuators 700 may include mirror elements 710a, 710b; support structures 711a, 711b; first electrodes 712a, 712b; second electrodes 714a, 714b; via connectors 716a, 716b; first electrodes 718a, 718b of a capacitor; a second electrode 724 of said capacitor; isolating materials 720, 722, a transparent substrate 726, a semi conducting material comprising a n-doped region 746 and p-doped regions 740a, 740b, optical isolators (e.g., including an opaque material) 742a, 742b, a support substrate 748, switches 732a, 732b, and/or a potential source 760. The actuators 70 of FIG. 7 may function in a manner similar, or substantially similar, to that as described above with regard to FIGS. 5 and/or 6 and, therefore, will not be further described herein. However, the actuators 700 of FIG. 7 may differ from the actuators 600 of FIG. 6 in that the LED may be arranged as a separate structure 750.

A metal (e.g., opaque material) 742a, 742b region may be introduced for suppressing (e.g., eliminating) cross talk between the different LEDs, and one LED per pixel element may be arranged in the structure 750.

Figure 8:
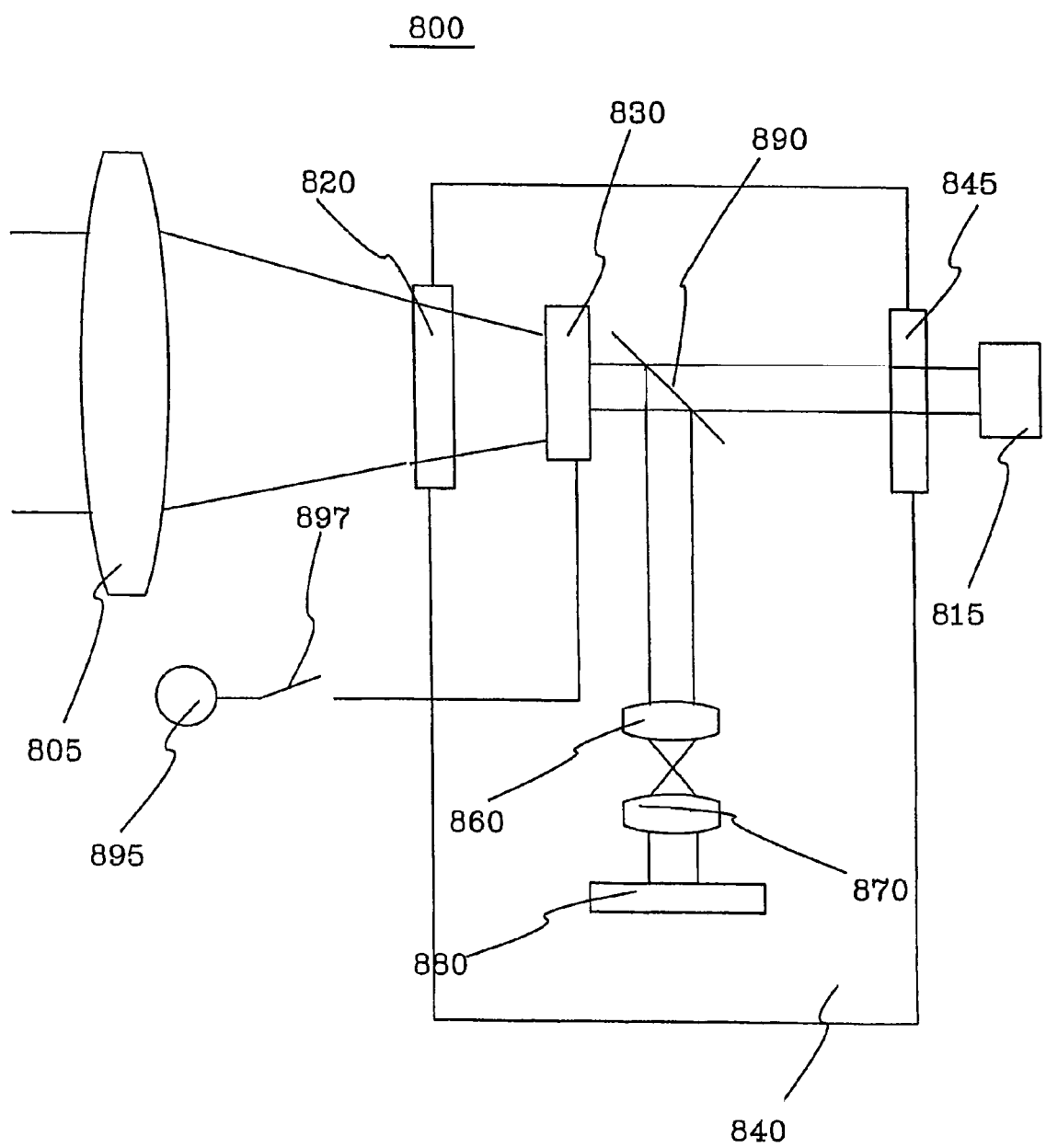
FIG. 8 illustrates a side view of an apparatus according to another example embodiment of the present invention.

FIG. 8 illustrates a side view of an apparatus for addressing an SLM and patterning a workpiece, according to another example embodiment of the present invention. As shown in FIG. 8, the addressing of the SLM may be performed by emitting electromagnetic radiation at the SLM. The apparatus 800 may include a contracting lens 805, a first window 820, an SLM 830, housing 840, a second window 845 a laser source 815, a beam splitter 890 a first lens 860, a second lens 870, a potential source 895, and/or a switch 897.

The contracting lens 805 may contract electromagnetic radiation, which may be used to address the SLM 830. The contracting may be performed in such a manner that each respective pixel may be set, for example, individually. One or a plurality of beams may be contracted, for example, simultaneously. The laser source 815 may impinge onto the SLM 830 and pattern the workpiece 880. Potential source 815 may be connected to the SLM 830 to set all, or substantially all, pixels in a deflection or non-deflection state. The switch 897 may be opened when impinging the electromagnetic radiation through the window 820 to address the SLM 830 as described above, for example, with regard to any or all of FIGS. 1-7. The housing 840 may be held at vacuum, wavelengths in the DUV and/or EUV region may be used, and the distance between the laser source 815 and the window 820 may be infinitesimal. In example embodiments of the present invention, the window 845 may be the exit window of the laser 815, and a spatial filter (not shown), for example, a Fourier filter, may be inserted between the first lens 860, (e.g., a Fourier lens), and the second lens 870 (e.g., a projection lens).

Example embodiments of the present invention may be used in a pattern generator utilizing an SLM for patterning a workpiece. In example embodiments of the present invention, an array may include, for example, several million micro-mirror structures, and pattern generators for patterning a workpiece using lithography may make use of a pulsed laser source for imaging the pattern on the SLM onto a workpiece. Stamps of the SLM on the workpiece may comprise at least a portion (e.g., a fraction) of the complete pattern to be imaged. Between laser flashes a new pattern description may be loaded into the SLM, for example, individual micro-mirrors may be set to new deflection states by applying a different potential difference between the mirror element and an underlying electrode. The different potential differences may be set according to example embodiments of the present invention disclosed above.

Example embodiments of the present invention have been described with regard to mirror elements, which may be initially set to a deflection state and set to the final state by illuminating the capacitor belonging to the specific pixel element. For example, the illumination may change from an initial deflection state to a less deflected state. However, example embodiments of the present invention may also begin with, for example, an non-deflected mirror element and deflect the mirror element by discharging the capacitor belonging to the mirror element, for example, if both the first electrode 512a, 512b and the second electrode 514a, 514b have the ground potential and a common capacitor electrode 524 is set to a potential different from ground potential.

While example embodiments of the present invention are disclosed by reference to the drawings discussed above, it is understood that these example embodiments are intended in an illustrative rather than limiting. Any modifications and combinations will readily occur to those skilled in the art, which modifications and combinations will be within the spirit of the invention and the scope of the following claims.

The invention claimed is:

1. A method comprising:
    charging at least one capacitor to a potential operable for setting at least one deflectable modulating element; and
    setting the at least one deflectable modulating element to a deflection state by selectively discharging the at least one capacitor; wherein
        the selective discharging is performed using one of a diode array and a diode configured to discharge the at least one capacitor.

2. The method according to claim 1, wherein the deflection state is achieved by at least one of emitting radiation from the diode array or the diode during variable time periods and emitting radiation from the diode array or the diode with different intensities.

3. The method of claim 1, wherein the at least one capacitor is selectively discharged to a potential by selectively impinging electromagnetic radiation onto the at least one capacitor.

4. The method according to claim 3, wherein the electromagnetic radiation is a laser beam.

5. The method according to claim 4, wherein the laser beam includes a plurality of beams configured to illuminate a plurality of capacitors simultaneously.

6. The method according to claim 1, wherein the deflection state is achieved by at least one of varying the intensity of electromagnetic radiation over a period of time and varying a period of time electromagnetic radiation impinges onto the at least one capacitor.

7. A method comprising:
    charging at least one capacitor to a potential operable for setting at least one deflectable modulating element;
    setting the at least one deflectable modulating element to a deflection state by selectively discharging the at least one capacitor;
    positioning an image on a workpiece; and
    emitting electromagnetic radiation onto the at least one deflectable modulating element to create an image on the workpiece; wherein
        each of the deflectable modulating elements are set to a maximum deflection state.

8. The method according to claim 7, wherein the charging of the at least one capacitor causes the deflectable modulating element to be placed in a state between a maximum and a minimum deflection state.

9. The method according to claim 7, further including, impinging electromagnetic radiation onto the at least one capacitor to perform the selective discharging.

10. The method according to claim 7, wherein the electromagnetic radiation is a laser beam.

11. The method according to claim 10, wherein the laser beam is a multi-beam laser beam.

12. The method according to claim 10, wherein the laser beam has a wavelength not affecting the workpiece.

13. A method comprising:
charging at least one capacitor to a potential operable for setting at least one deflectable modulating element in a spatial light modulator comprising a plurality of modulating elements and a plurality of capacitors, wherein each of said capacitors is associated with at least one electrode;
setting the at least one deflectable modulating element to a deflection state by selectively discharging the at least one capacitor, wherein said selective discharging of said at least one capacitor is performed by emitting electromagnetic radiation onto at least one electrode associated with said at least one capacitor, at least two of said deflectable modulating elements being associated with different capacitors of said plurality of capacitors, and at least one of said at least two deflectable modulating elements being individually set to a deflection state by said selective discharging of said at least one capacitor;
positioning an image on the workpiece; and
emitting electromagnetic radiation onto the at least one deflectable modulating element to create an image on the workpiece; wherein
at least two deflectable modulating elements each have a corresponding capacitor, one electrode of the at least two capacitors are coupled together.

14. The method according to claim 13, further including, impinging electromagnetic radiation onto the at least one capacitor to perform the selective discharging.

15. The method according to claim 13, wherein the electromagnetic radiation is a laser beam.

16. The method according to claim 15, wherein the laser beam is a multi-beam laser beam.

17. The method according to claim 15, wherein the laser beam has a wavelength not affecting the workpiece.

18. A method comprising:
charging at least one capacitor to a potential operable for setting at least one deflectable modulating element;
setting the at least one deflectable modulating element to a deflection state by selectively discharging the at least one capacitor;
positioning an image on the workpiece; and
emitting electromagnetic radiation onto the at least one deflectable modulating element to create an image on a workpiece; wherein
the selective discharging is performed by a diode or an array of diodes configured to discharge the at least one a capacitor.

19. The method according to claim 18, wherein the charging causes the at least one deflectable modulating element to be in a state between a maximum and a minimum deflection state.

20. An apparatus for patterning a workpiece, the apparatus comprising:
an electromagnetic radiation source;
a spatial light modulator having a plurality of deflectable modulating elements configured to be illuminated by the electromagnetic radiation;
a projection system configured to create an image of the spatial light modulator on a workpiece;
a positioning system configured to position at least one of the workpiece and the projection system relative to each other; wherein
the plurality of modulating elements are configured to create a number of modulating states greater than or equal to two by charging at least one capacitor,
at least of the deflectable modulating elements including the at least one capacitor chargeable with a potential operable for setting the at least one deflectable modulating element by selectively discharging the at least one capacitor to a potential, and
the discharging is performed by a diode or an array of diodes configured to discharge the at least one a capacitor.

21. The apparatus according to claim 20, wherein the mirror element is set by at least one of varying a period of time an intensity of the electromagnetic radiation is impinged and alternating the intensity of the electromagnetic radiation impinged over a period of time.

22. The apparatus according to claim 20, wherein the mirror element is deflected or non-deflected before selectively discharging the capacitors.

23. The apparatus according to claim 20, wherein the corresponding capacitor is fully charged before discharging.

24. The apparatus according to claim 20, wherein the discharging is performed by impinging electromagnetic radiation on the corresponding capacitor coupled to the electrode.

25. The apparatus according to claim 20, wherein each of the reflecting elements has an electrode coupled to one of the plurality of capacitors and the reflecting elements are set individually by at least one of alternating the period of time over which an intensity of the electromagnetic radiation is impinged and alternating the intensity of the electromagnetic radiation impinged over a period of time.

26. The apparatus according to claim 20, wherein the at least one reflecting element is deflected or non-deflected before selectively discharging the one of the plurality of capacitors coupled to the electrode.

27. The apparatus according to claim 20, wherein each of the plurality of deflectable modulating elements includes a corresponding capacitor and each capacitor is charged simultaneously.

28. The apparatus according to claim 20, wherein the at least one capacitor is fully charged.

29. The apparatus according to claim 20, wherein the charging of the at least one capacitor causes the at least one deflectable modulating element to be placed in a state between a maximum and a minimum deflection state.

30. The apparatus according to claim 20, wherein each of the plurality of deflectable modulating elements includes a corresponding capacitor and an electrode of each corresponding capacitor is coupled together.

31. The apparatus according to claim 20, wherein the discharging of the at least one capacitor is performed by impinging electromagnetic radiation onto the at least one capacitor.

32. The apparatus according to claim 31, wherein the laser beam discharging the capacitor is separate from the laser beam illuminating the plurality of deflectable modulating elements for creating the image on the workpiece.

33. The apparatus according to claim 20, wherein the electromagnetic radiation is a laser beam.

* * * * *